United States Patent

Schwarte et al.

[11] Patent Number: 6,001,915
[45] Date of Patent: Dec. 14, 1999

[54] POLYURETHANE-MODIFIED POLYACRYLATE

[75] Inventors: Stephan Schwarte, Emsdetten; Egon Wegner; Gerhard Reusmann, both of Münster; Cornelia Petri-Huber, Würzburg, all of Germany

[73] Assignee: BASF Coating AG, Muenster-Hiltrup, Germany

[21] Appl. No.: 08/836,015

[22] PCT Filed: Oct. 18, 1995

[86] PCT No.: PCT/EP95/04091

§ 371 Date: Sep. 16, 1997

§ 102(e) Date: Sep. 16, 1997

[87] PCT Pub. No.: WO96/12747

PCT Pub. Date: May 2, 1996

[30] Foreign Application Priority Data

Oct. 20, 1994 [DE] Germany ............................ 44 37 535

[51] Int. Cl.⁶ ....................... C09D 151/06; C09D 175/04
[52] U.S. Cl. .................... 524/457; 524/456; 524/591; 525/454; 525/455; 428/423.1
[58] Field of Search ........................ 428/423.1; 524/456, 524/457, 591; 525/454, 455

[56] References Cited

U.S. PATENT DOCUMENTS 5,169,719 12/1992 Balatan ................................... 525/455
5,494,980 2/1996 Buter ...................................... 525/455
5,552,496 9/1996 Vogt-Birnbrich ....................... 525/454
5,569,715 10/1996 Grandhee ............................... 525/455

Primary Examiner—David Buttner

[57] ABSTRACT

The present invention relates to a polyurethane-modified polyacrylate which is obtainable I. by polymerization with the addition
   a1) of an essentially carboxyl-free acrylate or of a mixture of acrylates,
   a2) of an ethylenically unsaturated monomer which carries at least one hydroxyl group per molecule and is essentially carboxyl-free or of a mixture of such monomers, and
   a3) of an essentially carboxyl-free, ethylenically unsaturated monomer which is different from (a1) and (a2), or of a mixture of such monomers, to give a polyurethane solution which contains no copolymerizable double bonds, II. by subsequent further polymerization and addition
   b1) of at least one ethylenically unsaturated monomer which carries one carboxyl group per molecule, or of a mixture of such monomers, and
   b2) of an essentially carboxyl-free, ethylenically unsaturated monomer, or of a mixture of such monomers, after the monomers added in step I have been almost completely reacted, and III. by neutralization after the end of the polymerization, and dispersion in water.

21 Claims, No Drawings

POLYURETHANE-MODIFIED POLYACRYLATE

The present invention relates to a polyurethane-modifed polyacrylate which is suitable for producing aqueous pigmented coating materials.

Coating materials of this kind are suitable for the basecoat/clearcoat techniques known from the prior art which are employed in particular in the automotive industry for producing high-quality finishes, especially metallic finishes (cf. EP-A-38127, EP-A-89497 and DE-A-3628124). In these techniques the predominant proportion of the basecoats employed comprise exclusively organic solvents as diluents and/or solvents.

For some years, therefore, the coatings industry has developed aqueous basecoats suitable for basecoat/clearcoat techniques. An essential feature of these basecoat/clearcoat techniques is that the transparent topcoat is applied to the unstoved basecoat and only then are the basecoat and topcoat stoved together (wet-on-wet technique).

Coating materials suitable for this procedure are described, inter alia, in DE-A-4009858. There, special water-thinnable polyacrylate resins are employed for the coating materials.

Basecoats suitable for wet-on-wet techniques are additionally described in DE-A-4010176. They contain as binder a polymer which is obtainable by reacting ethylenically unsaturated monomers and polyurethane resins in an organic solvent or in a mixture of organic solvents. Essential in this process is the use of polymerizable double bonds in the preparation of the polyurethane resins.

Experience to date has indicated that the coating materials applied by the wet-on-wet technique still do not have sufficient stability on storage. This is particularly the case if storage takes place under the elevated temperatures encountered in practice.

Accordingly, the present invention has set itself the object of providing a polyurethane-modifed polyacrylate which is suitable for the production of aqueous basecoats and brings about, in these basecoats, an increased storage stability.

This object is achieved in that the polyurethane-modified polyacrylate is obtainable I. by polymerization with the addition
   a1) of an essentially carboxyl-free acrylate or of a mixture of acrylates,
   a2) of an ethylenically unsaturated monomer which carries at least one hydroxyl group per molecule and is essentially carboxyl-free or of a mixture of such monomers, and
   a3) of an essentially carboxyl-free, ethylenically unsaturated monomer which is different from (a1) and (a2), or of a mixture of such monomers,
to give a polyurethane solution which contains no copolymerizable double bonds, II. by subsequent further polymerization and addition
   b1) of at least one ethylenically unsaturated monomer which carries one carboxyl group per molecule, or of a mixture of such monomers, and
   b2) of an essentially carboxyl-free, ethylenically unsaturated monomer, or of a mixture of such monomers,
after the monomers added in step I have been almost completely reacted, and III. by neutralization after the end of the polymerization, and dispersion in water.

The proportions by weight of (a1) are 40–90, preferably 40–80% by weight, of (a2) 0–45, preferably 4–34% by weight, of (a3) 0–40, preferably 10–30% by weight, of (b1) 2.5–15, preferably 3–7% by weight, and of (b2) 0–60, preferably 0–28% by weight.

In accordance with the invention the polyurethane, which contains no copolymerizable double bonds, is dissolved in an organic solvent or a solvent mixture. The polymerization according to stage II is preferably not carried out until at least 80% of the monomers added in stage I have been reacted.

The water-thinnable polyacrylate resins employed in accordance with the invention make it possible to formulate basecoats which—especially in comparison with known basecoats containing polyacrylate resin—feature improved storage stability.

For the preparation of the polyacrylate resins to be employed in accordance with the invention it is possible to employ as component (a1) any essentially carboxyl-free esters of (meth)acrylic acid which are copolymerizable with (a2), (a3), (b1) and (b2), or a mixture of such (meth)acrylic esters. Examples are alkyl acrylates and alkyl methacrylates having up to 20 carbon atoms in the alkyl radical, such as methyl, ethyl, propyl, butyl, hexyl, ethylhexyl, stearyl and lauryl acrylate and methacrylate, and cycloaliphatic (meth)acrylic esters, for example cyclohexyl (meth)acrylate. It is preferred to employ as component (a1) mixtures of alkyl acrylates and/or alkyl methacrylates which consist to the extent of at least 25% by weight of n-butyl and/or t-butyl acrylate and/or n-butyl and/or t-butyl methacrylate.

As component (a2) it is possible to employ all ethylenically unsaturated monomers which carry at least one hydroxyl group per molecule and are essentially carboxyl-free and are copolymerizable with (a1), (a3), (b1) and (b2), or a mixture of such monomers. Examples are hydroxyalkyl esters of acrylic acid, methacrylic acid or of another $\alpha,\beta$-ethylenically unsaturated carboxylic acid. These esters can be derived from an alkylene glycol which is esterified with the acid or can be obtained by reacting the acid with an alkylene oxide. As component (a2) it is preferred to employ hydroxyalkyl esters of acrylic acid and methacrylic acid in which the hydroxyalkyl group contains up to 4 carbon atoms, reaction products of cyclic esters, for example $\epsilon$-caprolactone and these hydroxyalkyl esters, or mixtures of these hydroxyalkyl esters and/or $\epsilon$-caprolactone-modified hydroxyalkyl esters. Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated acids, for example ethacrylic ester, crotonic acid and similar acids having up to about 6 carbon atoms per molecule, can also be employed.

As component (a3) it is possible to employ all ethylenically unsaturated monomers which are essentially carboxyl-free and are different from (a1) and (a2) and are copolymerizable with (a1), (a2), (b1) and (b2), or mixtures of such monomers. As component (a3) it is preferred to employ vinylaromatic hydrocarbons, such as styrene, $\alpha$-alkylstyrene and vinyltoluene.

The polyacrylate resins used in accordance with the invention are prepared by polymerizing in stage I the component (a1) alone or together with (a2) and, if desired, together with (a3) and in the presence of a polyurethane which contains no copolymerizable double bonds, in an organic solvent or solvent mixture. The polyurethane resin is prepared from the following components:

a) a polyester- and/or polyetherpolyol having a number-average molecular weight of from 400 to 5000, or a mixture of such polyester- and/or polyetherpolyols b) a polyisocyanate, or a mixture of polyisocyanates c) if desired, a compound which has at least one group which is reactive towards isocyanate groups, and at least one group capable of forming anions, in the molecule, or a mixture of such compounds d) if desired, a compound which has at least one group which is reactive towards NCO groups, and at least one poly(oxyalkylene) group, in the molecule, or a mixture of such compounds, and, if desired, e) a hydroxyl- and/or amino-containing organic compound having a molecular weight of from 60 to 600, or a mixture of such compounds.

The polyurethane resin should have a number-average molecular weight of from 700 to 30,000, preferably from 500 to 15,000. It is preferred for the polyurethane resin to have an acid number of from 0 to 2.0. The molecular weight of the polyurethane resins can—as is known to the skilled worker—be controlled in particular by the proportion and the functionality of the starting compounds (a) to (f) employed.

The polyurethane resins can be prepared either without solvent or in organic solvent. The polyurethane resins can be prepared by simultaneous reaction of all the starting compounds. In many cases, however, it is expedient to prepare the polyurethane resins in stages. For example, it is possible to prepare an isocyanate-functional prepolymer which is then reacted further. It is also possible to prepare an isocyanate-functional pre-polymer from components (a), (b), (c) and, if used, (d) and (e), which can then be reacted with the component (f) to form polyurethanes of relatively high molecular mass. In cases where as component (d) a compound is employed which contains only one group which is reactive towards isocyanate groups, it is possible in a first stage to prepare from (c) and (d) an isocyanate-functional precursor which can subsequently be reacted further with the other components.

The reaction of components (a) to (f) is judiciously carried out in the presence of catalysts, for example dibutyltin dilaurate, dibutyltin maleate, tertiary amines, etc.

The amounts of component (a), (b), (c), (d), (e) and (f) to be employed result from the desired number-average molecular weight and the desired acid number.

As component (b) it is possible to employ saturated and unsaturated polyester- and/or polyetherpolyols which contain no polymerizable double bonds, especially polyester- and/or polyetherdiols having a number-average molecular weight of from 400 to 5000. Examples of suitable polyetherdiols are polyetherdiols of the general formula H(—O—(CHR$^1$)$_n$—)$_m$OH, in which R$^1$ is hydrogen or a lower substituted or unsubstituted alkyl radical, n is 2 to 6, preferably 3 to 4 and m is 2 to 100, preferably 5 to 50. Examples are linear or branched polyetherdiols such as poly(oxyethylene) glycols, poly(oxypropylene) glycols and poly(oxybutylene) glycols. The polyetherdiols selected should not introduce any excessive amounts of ether groups, since otherwise the polymers formed swell in water. The preferred polyetherdiols are poly(oxypropylene) glycols in the molar mass range M$_n$ from 400 to 3000.

Polyesterdiols are prepared by esterifying organic dicarboxylic acids or their anhydrides with organic diols, or are derived from a hydroxycarboxylic acid or a lactone. In order to prepare branched polyesterpolyols it is possible to a minor extent to employ polyols or polycarboxylic acid having a valency higher than 2. The dicarboxylic acids and diols can be linear or branched aliphatic, cycloaliphatic or aromatic dicarboxylic acids or diols.

The diols used to prepare the polyesters consist, for example, of alkylene glycols, such as ethylene glycol, propylene glycol, butylene glycol, 1,4-butanediol, 1,6-hexanediol, neopentylglycol and other diols, such as dimethylolcyclohexane. However, it is also possible to add small amounts of polyols such as trimethylolpropane, glycerol and pentaerythritol. The acid component of the polyester consists primarily of low molecular mass dicarboxylic acids or their anhydrides having 2 to 44, preferably 4 to 36 carbon atoms in the molecule. Examples of suitable acids are o-phthalic acid, isophthalic acid, terephthalic acid, tetrahydrophthalic acid, cyclohexane-dicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, where they exist. In the course of the formation of polyesterpolyols it is also possible for relatively small amounts of carboxylic acids having three or more carboxyl groups to be present, for example trimellitic anhydride or the adduct of maleic anhydride with unsaturated fatty acids.

It is also possible to employ polyesterdiols which are obtained by reacting a lactone with a diol. They are notable for the presence of terminal hydroxyl groups and repeating polyester units of the formula (—CO—(CHR$^2$)$_n$—CH$_2$—O). In this formula n is preferably 4 to 6 and the substituent R$^2$ is hydrogen or an alkyl, cycloalkyl or alkoxy radical. No substituent contains more than 12 carbon atoms. The total number of carbon atoms in the substituent does not exceed 12 per lactone ring. Examples are hydroxycaproic acid, hydroxybutyric acid, hydroxy-decanoic acid and/or hydroxystearic acid.

For the preparation of the polyesterdiols preference is given to the unsubstituted ε-caprolactone, in which n has the value 4 and all substituents R$^2$ are hydrogen. The reaction with lactone is started by low molecular mass polyols such as ethylene glycol, 1,3-propanediol, 1,4-butanediol and dimethylolcyclohexane. However, it is also possible to react other reaction components, such as ethylenediamine, alkyldialkanolamines or else urea, with caprolactone. Other suitable diols of relatively high molecular mass are polylactamdiols which are prepared by reacting, for example, ε-caprolactam with low molecular mass diols.

As component (c) it is possible to employ aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate.

On the basis of their good resistance to ultraviolet light (cyclo)aliphatic polyisocyanates give rise to products having a low tendency towards yellowing. Examples of cycloaliphatic polyisocyanates are isophorone diisocyanate, cyclopentylene diisocyanate and also the hydrogenation products of the aromatic diisocyanates, such as cyclohexylene diisocyanate, methylcyclohexylene diisocyanate and dicyclohexylmethane diisocyanate. Examples of aliphatic diisocyanates are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Another example of an aliphatic diisocyanate is tetramethylxylene diisocyanate. Particularly preferred diisocyanates are isophorone diisocyanate, dicyclohexylmethane diisocyanate and tetramethylxylene diisocyanate.

With respect to the functionality of the polyisocyanates the component (c) must have a composition such that no crosslinked polyurethane resin is obtained. In addition to diisocyanates the component (c) can also include a proportion of polyisocyanates having functionalities of more than two—triisocyanates, for example.

Products which have proven suitable as triisocyanates are those formed by the trimerization or oligomerization of diisocyanates or by the reaction of diisocyanates with polyfunctional compounds containing OH or NH groups. These include, for example, the biuret of hexamethylene diisocyanate and water, the isocyanurate of hexamethylene diisocyanate, or the adduct of isophorone diisocyanate with trimethylolpropane. The mean functionality can be lowered if desired by adding monoisocyanates. Examples of such chain-terminating monoisocyanates are phenyl isocyanate, cyclohexyl isocyanate and stearyl isocyanate.

As esterifying component it is possible in accordance with the invention to employ polymeric fatty acids. These can be prepared by polymerizing fatty acids, for example linolenic, linoleic or oleic acid, individually, in a mixture, or in a mixture with saturated fatty acids. They result in a mixture which depending on the reacting regime comprises principally dimeric molecules but also monomeric and trimeric molecules as well as by-products. It is normally purified by distillation. Commercial polymeric fatty acids generally include at least 80% by weight of dimeric fatty acid, up to 20% by weight of trimeric fatty acids and not more than 1% by weight of monomeric fatty acids. It is preferred to employ polymeric fatty acids which consist to the extent of at least 98% by weight of dimeric fatty acids and to the extent of not more than 2% by weight of trimeric fatty acids with no more than traces of monomeric fatty acids.

Polymeric fatty acids contain both cyclic and linear aliphatic molecule fragments. In the context of the present inventions, however, they are regarded not as cycloaliphatic but as linear aliphatic polycarboxylic acids.

Groups capable of forming anions are introduced into the polyurethane molecules via the incorporation of compounds (d) into the polyurethane molecules, which contain at least one group which is reactive towards isocyanate groups, and a group capable of forming anions, in the molecule. The amount of component (d) to be employed can be calculated from the desired acid number.

As component (d) it is preferred to employ compounds which contain two groups which are reactive towards isocyanate groups in the molecule. Suitable groups which are reactive towards isocyanate groups are, in particular, hydroxyl groups, and also primary and/or secondary amino groups. Suitable groups capable of forming anions are carboxyl, sulfonic acid and/or phosphonic acid groups, preference being given to carboxyl groups. As component (d) it is possible, for example, to employ alkanoic acids having two substituents on the α carbon atom. The substituent can be a hydroxyl group, an alkyl group or, preferably, an alkylol group. These alkanoic acids have at least one, generally from 1 to 3 carboxyl groups in the molecule. They have from two to about 25, preferably from 3 to 10 carbon atoms. Examples of component (d) are dihydroxypropionic acid, dihydroxysuccinic acid and dihydroxybenzoic acid. A particularly preferred group of alkanoic acids are the α,α-dimethylolalkanoic acids of the general formula $R^4$—C$(CH_2OH)_2COOH$, in which $R^4$ is a hydrogen atom or an alkyl group having up to about 20 carbon atoms. Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of amino-containing compounds are α,δ-diaminovaleric acid, 3,4-diaminobenzoic acid, 2,4-diaminotoluenesulfonic acid and 2,4-diaminodiphenyl ether sulfonic acid.

With the aid of component (e) it is possible to introduce poly(oxyalkylene) groups, as nonionic stabilizing groups, into the polyurethane molecules. As component (e) it is possible, for example, to employ alkoxypoly(oxyalkylene) alcohols with the general formula R'O—(—CH$_2$—CR"—O—)$_n$H in which R' is an alkyl radical having 1 to 6 carbon atoms, R" is a hydrogen atom or an alkyl radical having 1 to 6 carbon atoms and n is a number between 20 and 75.

The use of the component (f) leads to an increase in the molecular weight of the polyurethane resins. As component (f) it is possible, for example, to employ polyols having up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentylglycol, neopentylglycol hydroxypivalate, hydroxyethylated or hydroxypropylated bisphenol A, hydrogenated bisphenol A and mixtures thereof. The polyols are generally employed in amounts of up to 30 per cent by weight, preferably from 2 to 20 per cent by weight, based on the amount of component (a) and (f) employed.

As component (f) it is also possible to employ di- and/or polyamines having primary and/or secondary amino groups. Polyamines are mainly alkylene polyamines having 1 to 40 carbon atoms, preferably about 2 to 15 carbon atoms. They can carry substituents which have no hydrogen atoms which are reactive with isocyanate groups. Examples are polyamines having a linear or branched aliphatic, cycloaliphatic or aromatic structure and at least two primary amino groups.

Diamines which may be mentioned are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane and aminoethylethanolamine. Preferred diamines are hydrazine, alkyl- or cycloalkyldiamines, such as propylenediamine and 1-amino-3-aminomethyl-3,5,5-trimethylcyclohexane.

It is also possible to employ as component (f) polyamines which contain more than 2 amino groups in the molecule. In these cases, however, it should be ensured—for example by using monoamines as well—that no crosslinked polyurethane resins are obtained. Such polyamines which can be used are diethylenetriamine, triethylenetetramine, dipropylenediamine and dibutylenetriamine. An example of a monoamine is ethylhexylamine.

As organic solvents and polymerization initiators it is possible to employ the solvents and polymerization initiators which are customary for the preparation of polyacrylate resins and are suitable for the preparation of aqueous dispersions. Examples of solvents which can be used are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, 3-methyl-3-methoxybutanol and propylene glycol. Examples of polymerization initiators which can be used are initiators which form free radicals, for example benzoyl peroxide, azobisisobutyronitrile, t-butyl perethylhexanoate and t-butyl perbenzoate. The polymerization is judiciously carried out at a temperature from 80 to 160°, preferably from 110 to 160°

C. After at least 80% by weight, preferably at least 90% by weight, of the monomers added in stage I have been reacted, in stage II
  (b1) from 2.5 to 15, preferably from 3 to 7% by weight of an ethylenically unsaturated monomer which carries at least one carboxyl group per molecule, or a mixture of such monomers, and
  (b2) from 0 to 60, preferably from 0 to 28% by weight of an ethylenically unsaturated monomer which is essentially carboxyl-free or a mixture of such monomers,
are added and are polymerized in the presence of the reaction product obtained in stage I. In stage II polymerization is continued until the monomers added in stages I and II have undergone essentially complete reaction.

As component (b1) it is possible to employ any ethylenically unsaturated monomer which carries at least one carboxyl group per molecule and is copolymerizable with (a1), (a2), (a3) and (b2), or a mixture of such monomers. As component (b1) it is preferred to employ acrylic acid and/or methacrylic acid. However, it is also possible to employ other ethylenically unsaturated acids having up to 6 carbon atoms in the molecule. Examples of such acids are ethacrylic acid, crotonic acid, maleic acid, fumaric acid and itaconic acid. As component (b1) it is also possible to employ mono(meth)acryloyloxyethyl maleate, mono(meth)acryloyloxyethyl succinate and mono(meth)acryloyloxyethyl phthalate.

As component (b2) it is possible to employ any ethylenically unsaturated monomer which is copolymerizable with (a1), (a2), (a3) and (b1), or a mixture of such monomers. All of the monomers listed in the description of components (a1), (a2) and (a3) can be employed as component (b2).

The nature and amount of components (a1), (a2), (a3), (b1) and (b2) are selected such that the polyacrylate resin has a hydroxyl number of from 0 to 200, preferably from 60 to 140, an acid number of from 20 to 100, preferably from 25 to 50, and a glass transition temperature ($T_g$) of from −40° C. to +60° C., preferably from −20 C. to +40° C.

The amount and rate of addition of the initiator are preferably chosen so as to give a polyacrylate resin having a number-average molecular weight of from 2500 to 20,000. It is preferred to begin the addition of initiator at the same point in time as the addition of the monomers and to end it about half an hour after the addition of the monomers has been ended. The initiator is preferably added in a constant amount per unit time. After the end of the addition of the initiator, the reaction mixture is held at polymerization temperature until (generally about 1½ hours) all the monomers employed have undergone essentially complete reaction. "Essentially complete" reaction is intended to denote that, preferably, 100% by weight of the monomers employed have been reacted, but that it is also possible for a small content of residual monomer of not more than up to about 0.5% by weight, based on the weight of the reaction mixture, to remain unreacted.

After the end of the polymerization the polyacrylate resin obtained is neutralized at least partially and dispersed in water.

For neutralization it is possible to use both organic bases and inorganic bases. Preference is given to the use of primary, secondary and tertiary amines, for example ethylamine, propylamine, dimethylamine, dibutylamine, cyclohexylamine, benzylamine, morpholine, piperidine and triethanolamine. Particular preference is given to the use of tertiary amines as neutralizing agents, especially dimethylethanolamine, triethylamine, tripropylamine and tributylamine.

The neutralization reaction is generally carried out by mixing the neutralizing base with the polyacrylate resin. In this case the amount of base employed is preferably such that the polyacrylate resin has a pH of 7–8.5, preferably from 7.2 to 7.8.

The partially or completely neutralized polyacrylate resin is subsequently dispersed by adding water. This produces an aqueous polyacrylate resin dispersion. If desired, some or all of the organic solvents can be removed by distillation.

The novel polyacrylate resin dispersions contain polyacrylate resin particles whose mean particle size is preferably between 60 and 300 nm (measurement method: laser light scattering, measuring instrument: Malvern Autosizer 2C).

Using the above-described polyacrylate resins as binders it is possible to produce novel aqueous basecoats. However, it is preferred to combine the polyacrylate resins with at least one water-thinnable polyester resin and/or at least one water-thinnable amino resin as binders. In the case of basecoats which comprise only nonmetallic pigments or mixtures of nonmetallic pigments and no metal pigments it is preferred to employ a mixture of
  (A) from 10 to 95, preferably from 25 to 70% by weight of the novel polyacrylate resin,
  (B) from 5 to 50, preferably from 10 to 40% by weight of an amino resin,
  (C) from 0 to 85, preferably from 20 to 60% by weight of a water-thinnable polyester resin.

The sum of the proportions by weight of components (A) to (C) is always 100% by weight.

As water-thinnable polyester resins it is preferred to employ those which are described in DE-A 4009858.

In addition to the above-described binders the novel basecoats may also contain further water-thinnable synthetic resins which serve for dispersing the pigments and/or as rheology-controlling additives. Examples of such synthetic resins are: polyethers, for example polypropylene glycol having a number-average molecular weight of from 400 to 1200, water-soluble cellulose ethers, such as hydroxyethylcellulose, methylcellulose or carboxymethylcellulose, and synthetic polymers containing ionic groups and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives or else hydrophobically modified ethoxylated urethanes or carboxyl-containing polyacrylates.

The novel basecoats can also comprise crosslinked polymer microparticles as are disclosed, for example, in EP-A-38 127.

The novel basecoats can also comprise inorganic rheology-controlling agents, for example phyllosilicates.

As pigments the novel basecoats can comprise colour-imparting pigments based on inorganic compounds, for example titanium dioxide, iron oxide, carbon black and the like, and/or colour-imparting pigments based on organic compounds, and/or customary metal pigments (for example commercial aluminium bronzes, stainless steel bronzes, etc.) and/or nonmetallic special-effect pigments (for example pearlescent or interference pigments). The novel basecoats preferably comprise metal pigments and/or special-effect pigments. The level of pigmentation is within the usual ranges.

At spray viscosity the novel basecoats generally have a solids content of from about 15 to 50% by weight. The solids content varies with the intended use of the basecoats. For metallic coating materials, for example, it is preferably from 17 to 25% by weight. For solid-colour coating materials it is higher, for example from 30 to 45% by weight.

The novel basecoats can in addition comprise customary organic solvents. The proportion thereof is kept as low as possible. For example, it is below 15% by weight.

The novel basecoats are generally adjusted to a pH of between 6.5 and 9.0. The pH can be established using customary amines, for example triethylamine, dimethylaminoethanol and N-methylmorpholine.

The novel basecoats can be employed both in production-line finishing and in refinishing. They are preferably employed in production-line finishing.

As transparent topcoats it is possible to employ coatings based on organic solvents, water-thinnable coating materials and also powder coatings. The coating materials can be employed as unpigmented clearcoats or as coating materials with transparent pigmentation.

Using the novel basecoats it is possible even without an overlying coat to prepare high-quality finishes with a transparent topcoat. In this way, one-coat finishes are obtained which are notable for a particularly high level of gloss.

The novel coating materials can be applied to any desired substrates, for example metal, wood, plastic or paper.

The invention is illustrated in more detail in the examples below.

A Preparing an Aqueous Polyester Resin Solution 729 parts by weight of neopentylglycol, 768 parts by weight of hexanediol, 462 parts by weight of hexahydrophthalic anhydride and 1710 parts by weight of a polymeric fatty acid (dimer content at least 98% by weight, trimer content not more than 2% by weight, monomer content not more than traces) are weighed into a reactor with stirrer, thermometer and packed column and are melted. The mixture is heated, with stirring, such that the column overhead temperature does not exceed 100° C. Esterification is carried out at not more than 220° C. until an acid number of 9 is reached. After cooling to 180° C., 768 parts by weight of trimellitic anhydride are added and esterification is continued until an acid number of 32 is reached. The mixture is then cooled to 120° C. and diluted with 1392 parts by weight of butylglycol. After cooling to 90° C., 158 parts by weight of dimethylethanolamine are added slowly and then 1150 parts by weight of deionized water are stirred in. This polyester resin solution is adjusted with dimethylethanolamine to a pH of 7.6 and with deionized water to a nonvolatiles content of 60% by weight.

B Preparing an Aqueous Polyurethane Dispersion 716.6 parts by weight of a condensation product (number-average molecular weight: 1410) of 1.81 mol of a polymeric fatty acid (dimer content at least 98% by weight, trimer content not more than 2% by weight, monomer content not more than traces), 0.82 mol of isophthalic acid, 0.61 mol of hexanediol and 0.61 mol of neopentylglycol, 61 parts by weight of dimethylolpropionic acid, 10.6 parts by weight of neopentylglycol, 365 parts by weight of methyl ethyl ketone and 308.3 parts by weight of m-TMXDI are heated at 80° C. in a stirrable reaction vessel under a nitrogen atmosphere. The reaction is continued to an NCO content of 1.1% by weight, based on the overall composition. Then 52.6 parts by weight of trimethylolpropane are added and the mixture is stirred at 80° C. until free isocyanate groups are no longer detectable. Then, slowly, 33 parts by weight of dimethylethanolamine, 255 parts by weight of butylglycol and, subsequently, 2153 parts by weight of deionized water are stirred in. The methyl ethyl ketone is distilled off in vacuo. A fine dispersion is obtained whose pH is adjusted with dimethylethanolamine to 7.4 and whose nonvolatiles content is adjusted with deionized water to 31% by weight.

C Preparing an Acrylicized Polyurethane Dispersion 525.5 parts by weight of a condensation product (number-average molecular weight: 1423) of 1 mol of a polymeric fatty acid (dimer content at least 98% by weight, trimer content not more than 2% by weight, monomer content not more than traces), 1 mol of isophthalic acid and 2.6 mol of hexanediol, 28.3 parts by weight of neopentylglycol, 9.0 parts by weight of trimethylolpropane monoallyl ether, 194 parts by weight of isophorone diisocyanate, 523.7 parts by weight of methyl isobutyl ketone and 0.5 part by weight of dibutyltin dilaurate are heated at 105° C. in a stirrable reaction vessel under a nitrogen atmosphere. The reaction is continued up to an NCO content of 1.1% by weight, based on the overall composition. Then 45 parts by weight of trimethylolpropane are added and the mixture is stirred at 105° C. until free isocyanate groups can no longer be detected. To this solution there is added at 105° C. over the course of 3 h a monomer mixture consisting of 370 parts by weight of n-butyl acrylate, 370 parts by weight of methyl methacrylate and 62.4 parts by weight of acrylic acid and, over the course of 3.5 h, an initiator solution consisting of 163.5 parts by weight of methyl isobutyl ketone and 24 parts by weight of t-butyl perethylhexanoate. The monomomer feed and the initiator feed begin simultaneously. About 3 h after the end of the initiator feed (SC 70–72%; viscosity= 3.0–6.0 dPas for sample/N-methylpyrrolidone=1:1) the mixture is cooled to 95° C. and 50 parts by weight of dimethylethanolamine are stirred in. The batch is then diluted with 2390 parts by weight of deionized water and the methyl isobutyl ketone is removed by distillation. The pH is adjusted to 7.7 with dimethylethanolamine and the nonvolatiles content is adjusted with deionized water to 40% by weight.

D Preparing the Novel, Polyurethane-modified Polyacrylate

Preparing the polyurethane solution:

500 parts by weight of a condensation product (number-average molecular weight: 1345) of 1 mol of a polymeric fatty acid (dimer content at least 98% by weight, trimer content not more than 2% by weight, monomer content not more than traces), 1.5 mol of isophthalic acid, 1.6 mol of neopentylglycol and 1.7 mol of hexanediol, 31.2 parts by weight of neopentylglycol, 185 parts by weight of methyl ethyl ketone, 201.7 parts by weight of m-TMXDI and 0.7 part by weight of dibutyltin dilaurate are heated at 80° C. in a stirrable reaction vessel under a nitrogen atmosphere. The reaction is continued up to an NCO content of 1.3% by weight, based on the overall composition. Then 30 parts by weight of diethanolamine are added and the mixture is stirred at 80° C. until free isocyanate groups can no longer be detected. Then 466 parts by weight of butylglycol are stirred in and the methyl ethyl ketone is removed by distillation in vacuo. The polyurethane solution is subsequently adjusted with butylglycol to a nonvolatiles content of 60% by weight.

28.44 parts by weight of butylglycol and 24.24 parts by weight of the abovementioned polyurethane solution are charged to a steel reactor fitted with monomer feed port, initiator feed port, thermometer, oil heating and reflux condenser, and this initial charge is heated to 110° C. Then a solution of 5.1 parts by weight of t-butyl perethylhexanoate in 6.0 parts by weight of butylglycol is added at a rate such that the addition is complete after 5 h 30 minutes. The addition of the t-butyl perethylhexanoate solution is begun at the same time as the addition of a mixture of (a1): 18.36 parts by weight of n-butyl methacrylate, 17.0 parts by weight of methyl methacrylate and 17.0 parts by weight of lauryl methacrylate; (a2) 17.34 parts by weight of hydroxypropyl acrylate, and (a3) 12.75 parts by weight of styrene is begun. The mixture of (a1), (a2) and (a3) is added at a rate such that the addition is complete within 5 h.

After all of the t-butyl perethylhexanoate solution has been added, the polymerization temperature is held at 110° C. for 1 h more.

Then a solution of 1.17 parts by weight of t-butyl perethylhexanoate in 3.5 parts by weight of butylglycol is added at a rate such that the addition is complete after 1 h 30 minutes. The addition of the t-butyl perethylhexanoate solution is begun at the same time as the addition of a mixture of (b1) 5.85 parts by weight of acrylic acid and (b2): 4.65 parts by weight of n-butyl methacrylate, 2.94 parts by weight of methyl methacrylate, 5.90 parts by weight of lauryl methacrylate; 1.25 parts by weight of hydroxypropyl acrylate and 2.94 parts by weight of styrene is commenced. The mixture of (b1) and (b2) is added at a rate such that the addition is complete within 1 h.

The temperature is subsequently held at 110° C. for 1 h 30 minutes. The resulting resin solution is concentrated to 80% by weight (solids content) by distillation in vacuo and is neutralized with dimethylethanolamine at 80° C. over the course of about 30 minutes, to a degree of neutralization of 80%. The resin solution is cooled to 60° C. and the heating is switched off. Then a quantity of water is added, slowly, which is such that the solids content of the dispersion is about 40% by weight.

The dispersion obtained has the following characteristic data: acid number 36.7 mg of KOH/g, and a pH of 7.6.

E Preparing an Aqueous Polyacrylate Dispersion 32 parts by weight of butylglycol are charged to a steel reactor fitted with monomer feed port, initiator feed port, thermometer, oil heating and reflux condenser, and this initial charge is heated to 110° C. Then a solution of 6.0 parts by weight of t-butyl perethylhexanoate in 6.0 parts by weight of butylglycol is added at a rate such that the addition is complete after 5 h 30 minutes. The addition of the t-butyl perethylhexanoate solution is begun at the same time as the addition of a mixture of (a1): 21.6 parts by weight of n-butyl methacrylate, 20.0 parts by weight of methyl methacrylate and 20.0 parts by weight of lauryl methacrylate; (a2) 20.4 parts by weight of hydroxypropyl acrylate, and (a3) 15.0 parts by weight of styrene is begun. The mixture of (a1), (a2) and (a3) is added at a rate such that the addition is complete within 5 h.

After all of the t-butyl perethylhexanoate solution has been added, the polymerization temperature is held at 110° C. for 1 h more.

Then a solution of 1.17 parts by weight of t-butyl perethylhexanoate in 3.5 parts by weight of butylglycol is added at a rate such that the addition is complete after 1 h 30 minutes. The addition of the t-butyl perethylhexanoate solution is begun at the same time as the addition of a mixture of (b1) 5.85 parts by weight of acrylic acid and (b2): 4.65 parts by weight of n-butyl methacrylate, 2.94 parts by weight of methyl methacrylate, 5.90 parts by weight of lauryl methacrylate; 1.25 parts by weight of hydroxypropyl acrylate and 2.94 parts by weight of styrene is commenced. The mixture of (b1) and (b2) is added at a rate such that the addition is complete within 1 h.

The temperature is subsequently held at 110° C. for 1 h 30 minutes. The resulting resin solution is concentrated to 80% by weight (solids content) by distillation in vacuo and is neutralized with dimethylethanolamine at 80° C. over the course of about 30 minutes, to a degree of neutralization of 80%. The resin solution is cooled to 60° C. and the heating is switched off. Then a quantity of water is added, slowly, which is such that the solids content of the dispersion is about 40% by weight. The dispersion obtained has the following characteristic data: acid number 36.8 mg of KOH/g, and a pH of 7.6.

I Preparing an Aqueous Metallic Basecoat (Comparison Example in Accordance with DE 40 09 858 A1)

33.5 parts by weight of thickener (paste of a sodium magnesium silicate with a laminar structure [laponite RD], 3% in water) are charged to a vessel.

To this initial charge is added a solution of 4.3 parts by weight of butylglycol and 7.7 parts by weight of a 70% strength solution of a commercial melamine resin in isobutanol (Maprenal MF927) with stirring. Then to this mixture are then added, in succession and with stirring, 33.3 parts by weight of the polyurethane dispersion from B, 0.4 part by weight of dimethylethanolamine (10% strength in water) and 4.8 parts by weight of the polyacrylate resin dispersion from E. Separately, an aluminium pigment suspension is prepared as follows: 4.4 parts by weight of a commercial chromated aluminium paste (65% in petroleum spirit/solvent naphtha/butylglycol, average particle diameter 15 $\mu$m) are homogenized with the addition of 4 parts by weight of butylglycol. Then 3.2 parts by weight of the water-soluble polyester resin from A and 1.0 part by weight of polypropylene glycol (number-average molecular weight: 900) are added to this suspension. This aluminium pigment suspension is stirred into the mixture described above. Subsequently, 3.8 parts by weight of deionized water are added and the mixture is adjusted with dimethylethanolamine (10% strength in water) to a pH of 7.7–8.0.

II Preparing an Aqueous Metallic Basecoat (Comparison Example in Accordance with DE 40 10 176)

33.5 parts by weight of thickener (paste of a sodium magnesium silicate with a laminar structure [laponite RD], 3% in water) are charged to a vessel.

To this initial charge is added a solution of 4.3 parts by weight of butylglycol and 7.7 parts by weight of a 70% strength solution of a commercial melamine resin in isobutanol (Maprenal MF927) with stirring. Then to this mixture are then added, in succession and with stirring, 33.3 parts by weight of the polyurethane dispersion from B, 0.4 part by weight of dimethylethanolamine (10% strength in water) and 4.8 parts by weight of the acrylicized polyurethane dispersion from C. Separately, an aluminium pigment suspension is prepared as follows: 4.4 parts by weight of a commercial chromated aluminium paste (65% in petroleum spirit/solvent naphtha/butylglycol, average particle diameter 15 $\mu$m) are homogenized with the addition of 4 parts by weight of butylglycol. Then 3.2 parts by weight of the water-soluble polyester resin from A and 1.0 part by weight of polypropylene glycol (number-average molecular weight: 900) are added to this suspension. This aluminium pigment suspension is stirred into the mixture described above. Subsequently, 3.8 parts by weight of deionized water are added and the mixture is adjusted with dimethylethanolamine (10% strength in water) to a pH of 7.7–8.0.

III Preparing a Novel Aqueous Metallic Basecoat 33.5 parts by weight of thickener (paste of a sodium magnesium silicate with a laminar structure [laponite RD], 3% in water) are charged to a vessel.

To this initial charge is added a solution of 4.3 parts by weight of butylglycol and 7.7 parts by weight of a 70% strength solution of a commercial melamine resin in isobutanol (Maprenal MF927) with stirring. Then to this mixture are then added, in succession and with stirring, 33.3 parts by weight of the polyurethane dispersion from B, 0.4 part by weight of dimethylethanolamine (10% strength in water)

and 4.8 parts by weight of the polyurethane-modified polyacrylate resin dispersion from D. Separately, an aluminium pigment suspension is prepared as follows: 4.4 parts by weight of a commercial chromated aluminium paste (65% in petroleum spirit/solvent naphtha/butylglycol, average particle diameter 15 μm) are homogenized with the addition of 4 parts by weight of butylglycol. Then 3.2 parts by weight of the water-soluble polyester resin from A and 1.0 part by weight of polypropylene glycol (number-average molecular weight: 900) are added to this suspension. This aluminium pigment suspension is stirred into the mixture described above. Subsequently, 3.8 parts by weight of deionized water are added and the mixture is adjusted with dimethylethanolamine (10% strength in water) to a pH of 7.7–8.0.

The basecoats produced in this way were compared by means of the following measurements:

Applications

Description of colour differences by colour locus determination of original and sample and calculation of the colour distances with their components, simultaneously for (as a rule) different illumination/observation geometries, to assess colour differences and flop behaviour in metallic and other effect finishes.

Method

In a manner similar to that of the method for solid-colour paints, the colour numbers and colour differences are determined for (as a rule) three different angular combinations. The graphs assisted the assessment of the behaviour of original and sample in the case of change in the angle of illumination/observation.

| Measuring Instruments | Illum./Obs. | Geom. | Measurement range | Step size | Bandwidth |
|---|---|---|---|---|---|
| MMK 111 | 45°–20° /0° /+25° | 25° 45° 70° | 400–700 nm | 10 nm | 5 nm |
| DMC 26 m. | var./var. | var. | 380–720 nm | 10 nm | 10 nm |

Evaluation

The characteristic number MF-D was determined as follows:

MF-D=50* (L 25–L 70):L 70

Sampling: Sample size MMK 111 at least 3*5 cm DMC 26 3*5 cm to 8*20 cm
Ref.: DIN 5033, DIN 6174

| Experiment | I | II | III |
|---|---|---|---|
| MF-D (fresh) | 73 | 71 | 74 |
| MF-D (4 wk 40° C.) | 63 | 58 | 72 |

It is found that the storage stability is significantly improved, especially at elevated temperature.

We claim:

1. A process of preparing a polyurethane-modified acrylic resin composition, comprising the steps of:
   (a) polymerizing, in the presence of a polyurethane composition containing no copolymerizable double bonds, an essentially carboxyl-free monomer mixture comprising
      (i) at least one acrylate monomer,
      (ii) at least one ethylenically unsaturated monomer having at least one hydroxyl group, and
      (iii) at least one further ethylenically unsaturated monomer;
   (b) when at least about 80% of the monomers of step (a) have reacted, adding and polymerizing
      (i) at least one ethylenically unsaturated monomer having at least one carboxyl group and
      (ii) at least one essentially carboxyl-free, ethylenically unsaturated monomer,
   wherein a polyurethane-modified acrylic resin composition is obtained.

2. A process according to claim 1, further comprising a step of at least partially neutralizing the acrylic resin and dispersing said resin by adding water, wherein an aqueous composition is obtained.

3. A process according to claim 1, wherein the polyurethane composition comprises an organic solvent or mixture of organic solvents.

4. A process according to claim 1, wherein said monomers are employed in the amounts of
   from about 40 to about 90 parts by weight (a)(i),
   up to about 45 parts by weight (a)(ii),
   up to about 40 parts by weight (a)(iii),
   from about 2.5 to about 15 parts by weight (b)(i), and
   up to about 60 parts by weight (b)(ii).

5. A process according to claim 1, wherein said monomers are employed in the amounts of
   from about 40 to about 80 parts by weight (a)(i),
   from about 4 to about 34 parts by weight (a)(ii),
   from about 10 to about 30 parts by weight (a)(iii),
   from about 3 to about 7 parts by weight (b)(i), and
   up to about 28 parts by weight (b)(ii).

6. A process according to claim 4, wherein the total weight of monomers (a)(i), (a)(ii), (a)(iii), (b)(i), and (b)(ii) is 100 parts by weight.

7. A process according to claim 5, wherein the total weight of monomers (a)(i), (a)(ii), (a)(iii), (b)(i), and (b)(ii) is 100 parts by weight.

8. A process according to claim 1, wherein the acrylic resin has a hydroxyl number of up to about 200, an acid number of from about 20 to about 100, and a glass transition temperature of from about −40 to about +60° C.

9. A process according to claim 1, wherein the acrylic resin has a hydroxyl number of from about 60 to about 140, an acid number of from about 25 to about 50, and a glass transition temperature of from about −20 to about +40° C.

10. A process according to claim 1, wherein at least about 90% of the monomers of step (a) have reacted when the addition of step (b) is begun.

11. A process according to claim 1, wherein said polyurethane is formed from a reaction mixture including a polyol selected from the group consisting of polyester polyols, polyether polyols and mixtures thereof; said polyols having a number average molecular weight of from about 400 to about 5000, and mixtures thereof.

12. A process according to claim 1, wherein the polyurethane has at least one functional group selected from the group consisting of carboxyl groups, sulfonic acid groups, phosphonic acid groups, poly(oxyalkylene) groups, and mixtures thereof; and further wherein the polyurethane-modified acrylic resin composition is an aqueous composition.

13. A process according to claim 1, wherein at least about 25% by weight of (a)(i) is selected from the group consisting of n-butyl acrylate, tert-butyl acrylate, n-butyl methacrylate, tert-butyl methacrylate, and mixtures thereof.

14. A process according to claim 1, wherein (a)(iii) comprises at least one vinylaromatic hydrocarbon.

15. A polyurethane-modified acrylic resin composition prepared according to the process of claim 1.

16. An aqueous coating composition comprising a polyurethane-modified acrylic resin composition prepared according to the process of claim 1.

17. An aqueous coating composition according to claim 16, further comprising a silicate compound.

18. An aqueous coating composition according to claim 17, wherein the silicate compound is a phyllosilicate.

19. An aqueous coating composition according to claim 16, further comprising at least one pigment.

20. An aqueous coating composition according to claim 19, wherein the composition comprises a pigment selected from the group consisting of aluminum pigments, pearlescent pigments, interference pigments, and mixtures thereof.

21. A coated article prepared according to a process comprising the step of applying an aqueous coating composition according to claim 16.

* * * * *